United States Patent [19]

Hong

[11] Patent Number: 5,627,691
[45] Date of Patent: May 6, 1997

[54] CHARACTER DATA RECORDING AND REPRODUCING SYSTEM FOR A VCR

[75] Inventor: Sung H. Hong, Seoul, Rep. of Korea

[73] Assignee: Goldstar Co., Ltd., Rep. of Korea

[21] Appl. No.: 473,788

[22] Filed: Jun. 7, 1995

Related U.S. Application Data

[63] Continuation-in-part of Ser. No. 366,012, Dec. 29, 1994, abandoned, and a continuation of Ser. No. 218,735, Mar. 28, 1994, abandoned, which is a continuation-in-part of Ser. No. 861,619, Apr. 1, 1992, abandoned.

[30] Foreign Application Priority Data

Apr. 2, 1991 [KR] Rep. of Korea .................. 5307/1991

[51] Int. Cl.$^6$ ........................................... G11B 27/02
[52] U.S. Cl. ...................... 386/54; 360/18; 360/35.1; 386/95
[58] Field of Search ...................... 360/13, 18, 19.1, 360/31, 33.1, 35.1, 14.1; 358/335, 341, 342, 311

[56] References Cited

U.S. PATENT DOCUMENTS

| | | | |
|---|---|---|---|
| 4,575,772 | 3/1986 | Shimada et al. | 360/19.1 |
| 4,688,105 | 8/1987 | Bloch et al. | 358/335 |
| 5,131,311 | 7/1992 | Murakami et al. | 358/342 |
| 5,132,807 | 7/1992 | Takimoto et al. | 358/335 |
| 5,233,438 | 8/1993 | Funahashi et al. | 358/341 |
| 5,250,747 | 10/1993 | Tsumura | 358/342 X |
| 5,347,404 | 9/1994 | Han | 360/19.1 |

*Primary Examiner*—Andrew L. Sniezek
*Attorney, Agent, or Firm*—Ostrolenk, Faber, Gerb & Soffen, LLP

[57] ABSTRACT

A character editing system for a VCR, comprising a control circuit for performing on-screen display control and recording control operations for character data in a character editing mode; a character recording circuit for encoding character data, demodulating the encoded data and recording the demodulated data on a selected one of stereo audio tracks of a video tape under a control of the control circuit; an audio reproducing circuit for detecting audio signals and character data from the audio tracks and outputting the detected audio signals to speakers; a video reproducing circuit for detecting video signals from a video track of the video tape and demodulating the detected video signals; and a character output circuit for outputting the character data which is to be recorded or the character data which is reproduced by the audio reproducing circuit, placing the data on the reproduced video signal from the video reproducing circuit, under a control of the control circuit. The character information signal is digitized and the digitized signal is recorded on the audio track of the video tape. Therefore, the character information can be viewed distinctly during playback of the VCR and degradation of the character edited portion of a video picture during playback of the VCR can be prevented, thereby assuring clarity of the video picture.

8 Claims, 3 Drawing Sheets

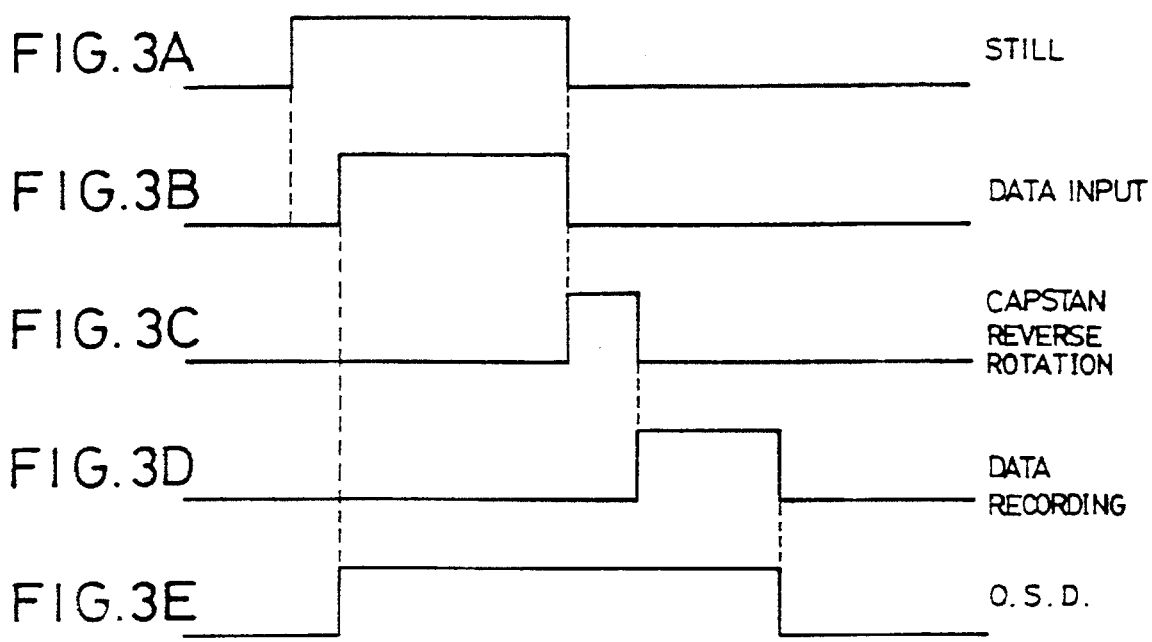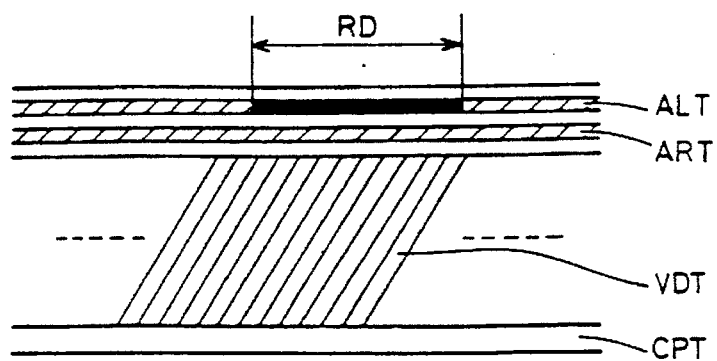

CHARACTER DATA RECORDING AND REPRODUCING SYSTEM FOR A VCR

This is a Continuation-in-Part of application Ser. No. 08/366,012; filed on Dec. 29, 1994 now abandoned, which is a continuation of application Ser. No. 08/218,735, filed Mar. 28, 1994, now abandoned, which is a continuation-in-part of application Ser. No. 07/861,619 filed Apr. 1, 1992, now abandoned.

BACKGROUND OF THE INVENTION

1. Field of the Invention

The present invention relates in general to a video cassette tape recorder (VCR), and more particularly, to a character editing system for a VCR that is available on a single VCR unit and records character information data on a predetermined portion of a video tape. By recording the character information data on a predetermined portion of a video tape the character information can be viewed distinctly during playback and degradation of the character edited portion, which tends to occur if the character information data is recorded on the video track, can be prevented.

2. Description of the Prior Art

A character editing system has generally been available on two separate VCRs. When character information is to be edited, one of the VCRs operates in a play mode to reproduce audio and video signals recorded on a video tape. The other VCR operates in a recording mode, generates an analog on-screen display signal for the character information to be edited, and records the on-screen display signal with the played-back video and audio signals from the first VCR on a video track of another video tape at a position corresponding to that of a video picture which is to be edited with the character information. In the prior art system, the character information is recorded on the video track, mixed with the played-back video signal. As mentioned above, it has conventionally not been possible to perform the character editing process with only one VCR unit. Also, in the conventional character editing process, portions of the video signal in front and after the character information may be erased. This results in indistinctness of the character information and blurring of character boundaries during playback.

SUMMARY OF THE INVENTION

Therefore, it is an object of the present invention to provide a character editing system for a VCR, which is available on one VCR and is capable of recording character information data on an audio track of a video tape, whereby the character information can be distinctly seen during playback and degradation of a character edited portion of a video picture in playback of the VCR can be prevented, thereby assuring a distinctness of the video picture.

In accordance with the present invention, the above object can be accomplished by providing a character editing system for a video cassette tape recorder for recording character information data on an audio track of a video tape. The system includes control means for controlling, in a character editing mode, on-screen display operations and recording control operations for character data inputted into the control means; recording means for recording the character data inputted into the control means on a selected audio track of a video tape; audio reproducing means for retrieving audio signals and recorded character data from the audio track and outputting the retrieved audio signals to speakers; video reproducing means for retrieving video signals from a video track of the video tape; and output means for receiving and selectively outputting the inputted character data from the recording means or the recorded character data retrieved by the audio reproducing means, and superimposing the outputted character data on the retrieved video signal from the video reproducing means.

BRIEF DESCRIPTION OF THE DRAWINGS

The above and other objects, features and advantages of the present invention will be more clearly understood from the following detailed description taken in conjunction with the accompanying drawings, in which:

FIGS. 3A to 3E are timing diagrams of the operation of the system in FIG. 1, wherein:

FIG. 3A is a waveform diagram illustrating a video picture still interval;

FIG. 3B is a waveform diagram illustrating a data input interval;

FIG. 3C is a waveform diagram illustrating a capstan motor reverse rotation interval;

FIG. 3D is a waveform diagram illustrating a character data recording interval; and FIG. 3E is a waveform diagram illustrating a character data on-screen display interval; and FIG. 4 shows a construction of a video tape including a position on which character data is recorded in accordance with the present invention.

DETAILED DESCRIPTION OF EMBODIMENTS OF THE INVENTION

Figure 1:
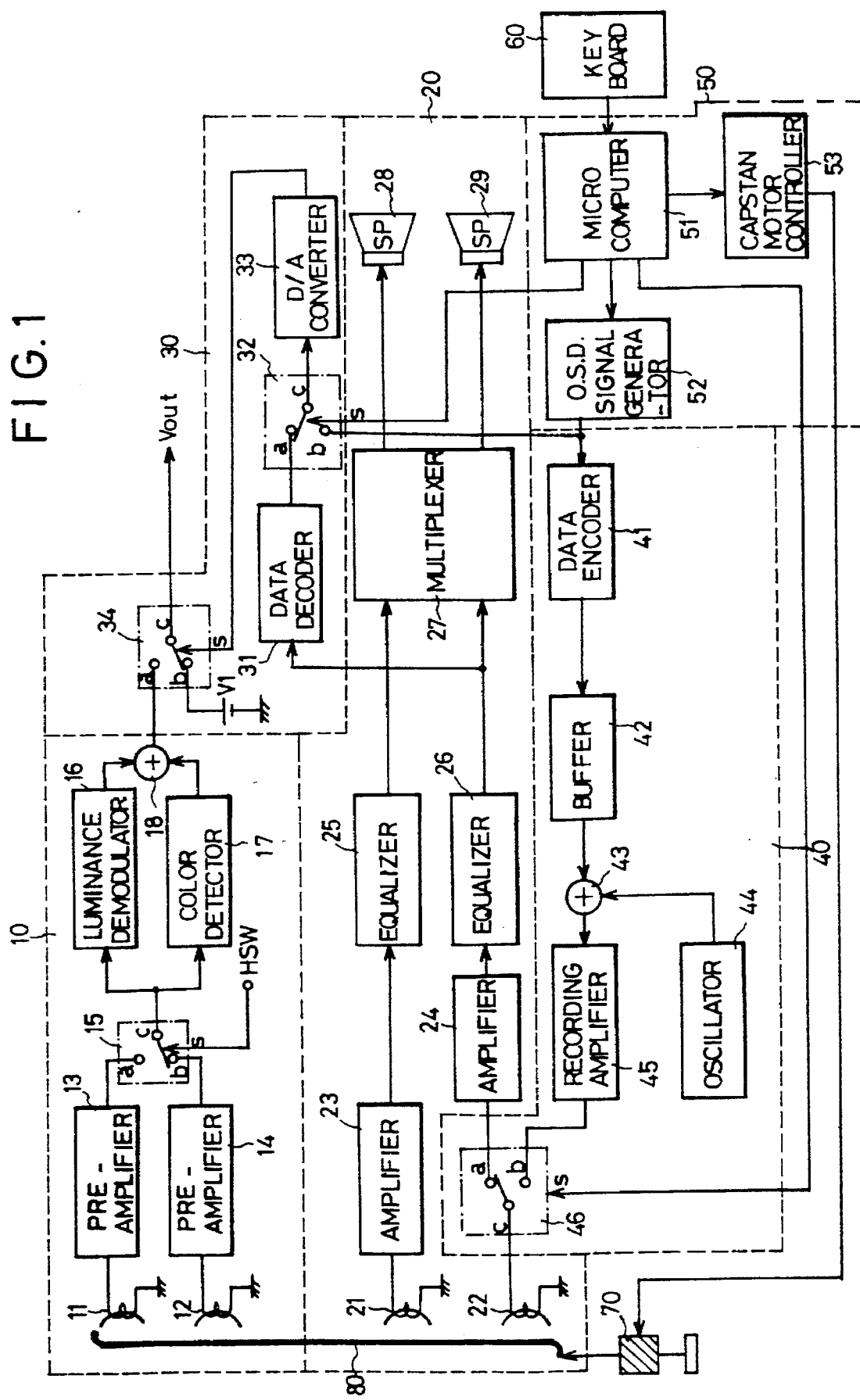
FIG. 1 is a block diagram of a character editing system for a VCR in accordance with the present invention.
Figure 2:
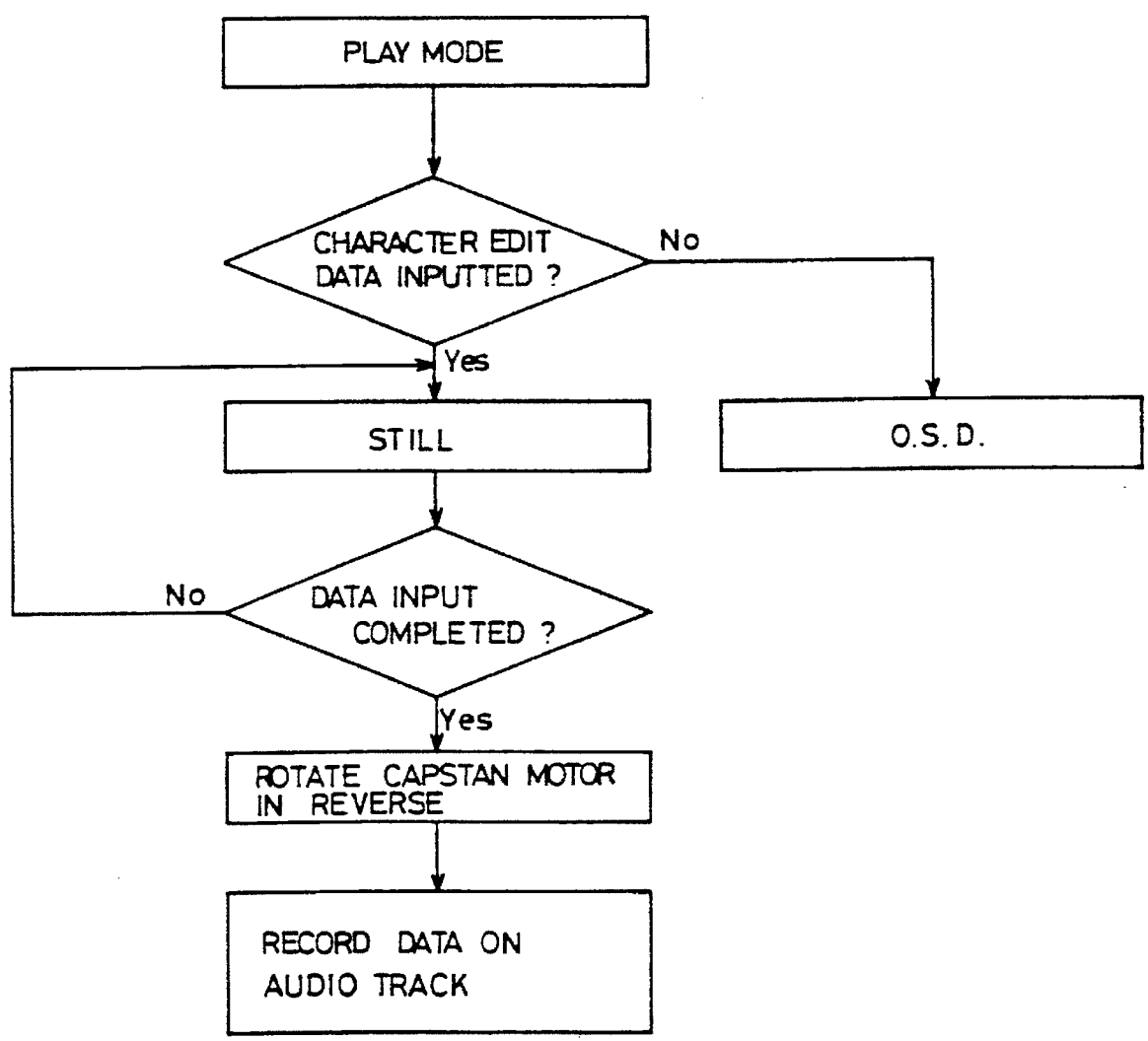
FIG. 2 is a flowchart illustrating the operation of the system in FIG. 1.

FIG. 1 shows a character editing system for a VCR according to the present invention including a control circuit 50 for controlling a VCR system based on an input signal and, in a character editing mode, generating an on-screen display signal for character information which is to be edited and performing a character editing control operation including the control of a capstan motor 70. A character recording circuit 40 for encoding the on-screen display signal from the control circuit 50, demodulating the encoded signal and recording the demodulated signal on a selected one of stereo audio tracks of a video tape 80 under the control of the control circuit 50. An audio reproducing circuit 20 for detecting audio signals and character data from the audio tracks and outputting the detected audio signals to speakers 28 and 29. A video reproducing circuit 10 for detecting video signals from a video track of the video tape 80 and demodulating the detected video signals. And, a character output circuit 30 for outputting the character data which is to be recorded or the character data which is reproduced by the audio reproducing circuit 20, and placing the character data on the reproduced video signal from the video reproducing circuit 10, under the control of the control circuit 50.

The video reproducing circuit 10 includes video heads 11 and 12 for detecting the video signals from the video track of the video tape 80, pre-amplifiers 13 and 14 for pre-amplifying the video signals detected by the video heads 11 and 12, respectively, a reproduced video signals switch 15 for selectively outputting one of the output signals from the pre-amplifiers 13 and 14 in response to a head switching signal, a luminance demodulator 16 for demodulating a luminance signal from an output signal from the reproduced video signal switch 15, a color detector 17 for detecting a color signal from the output signal from the reproduced video signal switch 15, and an adder 18 for combining output signals from the color detector 17 and luminance demodulator 16 and outputting the combined signal as a reproduced video signal.

The audio reproducing circuit 20 includes audio heads 21 and 22 for detecting the audio signals and character data from the audio tracks of the video tape 80, amplifiers 23 and 24 for amplifying output signals from the audio heads 21 and 22, respectively, equalizer circuits 25 and 26 for equalizing output signals from the amplifiers 23 and 24, respectively, and a multiplexer 27 for selectively outputting output signals from the equalizer circuits 25 and 26 to the speakers 28 and 29.

The character output circuit 30 includes a data decoder 31 for decoding the character data reproduced by the audio reproducing circuit 20, a character selecting switch 32 for selecting one of the reproduced character data from the data decoder 31 and recording character data encoded by the character recording circuit 40 under the control of the control circuit 50, a digital/analog (D/A) converter 33 for converting an output signal from the character selecting switch 32 into an analog signal and outputting the analog signal as a character information signal to a character combining unit 34, and the character combining unit 34 for superimposing the character information signal on the reproduced video signal from the video reproducing circuit 10, whereby the video signal containing the character information signal is outputted therefrom.

Also, the character recording circuit 40 includes a data encoder 41 for encoding the on-screen display signal from the control circuit 50, a buffer 42 for buffering an output signal from the data encoder 41, an oscillator 44 for generating a reference frequency signal for modulation of the recording character data, an adder 43 for combining an output signal from the buffer 42 and the reference frequency signal from the oscillator 44, a recording amplifier 45 for amplifying an output signal from the adder 43 suitably to a recording head characteristic, and a character recording/reproducing switch 46 for applying an output signal from the recording amplifier 45 to the audio head 22 for its recording, or for transferring the detected signal from the audio head 22 to the amplifier 24 in the audio reproducing circuit 20 under the control of the control circuit 50.

On the other hand, the control circuit 50 includes a microcomputer 51 for scanning a keyboard 60 and performing switching control operations for the character output circuit 30 and the character recording circuit 40, and the character editing control operation in accordance with the scanned results, an on-screen display signal generator 52 for generating the on-screen display signal for the character data from the microcomputer 51, and a capstan motor controller 53 for controlling an operation of the capstan motor 70 under the control of the microcomputer 51.

Now, the operation of the system with the above-mentioned construction in accordance with the present invention will be described in detail with references to FIGS. 2 and 3A to 3E, which are respectively a flowchart and a timing diagram for illustrating the operation of the system in FIG. 1.

First, the user operates the VCR in a play mode in order to search for a desired portion of a video picture into which character information is to be inserted. Finding the desired portion of the video picture, the user gives pause to the operation of the VCR. Namely, when the current video picture portion is the desired portion of the video picture into which character information is to be inserted, the user pushes a PAUSE key on the keyboard 60. At this time, the microcomputer 51 generates a picture pause voltage, thereby causing the capstan motor controller 53 to stop the capstan motor 70. As a result, the VCR is stopped, showing the desired portion of the video picture into which character information is to be inserted by the user.

At this time, the user pushes an EDIT key on the keyboard 60, in order to insert into the VCR, character information including characters to be displayed, displaying interval of the characters and so forth, utilizing an on-screen display (OSD) function of the VCR. When the EDIT key is pushed, the microcomputer 51 controls the character selecting switch 32 in the character output circuit 30 such that a movable terminal c of the switch 32 is connected to one fixed terminal b thereof. Then, upon receiving the character information, the microcomputer 51 stores the inputted character information and controls the on-screen display signal generator 52 to output the on-screen display signal for the character information.

The on-screen display signal from the on-screen display signal generator 52 in the control circuit 50 is encoded by the data encoder 41 in the character recording circuit 40. Then, the encoded signal from the data encoder 41 is applied to the fixed terminal b of the character selected switch 32. Since the movable terminal c of the switch 32 is connected to the fixed terminal b as mentioned above, the encoded signal from the data encoder 41 is applied to the D/A converter 33 through the switch 32. The D/A converter 33 converts the output of the data encoder 41 into an analog signal and outputs the analog signal as the character information signal to the character combining unit 34. When the character information signal is outputted from the D/A converter 33 to the character combining unit 34, the character combining unit 34 superimposes the character information signal on the reproduced video signal from the video reproducing circuit 10 and outputs the superimposed signal to the screen (not shown). At this time, since a head drum rotates continuously although the capstan motor 70 is in the its stopped state, a still video picture continues to be reproduced by the video reproducing circuit 10. Whereby, the character information signal is outputted from the character combining switch 34, and is imposed on the repeatedly reproduced still video picture. As a result, the user can determine and modify positions, sizes and forms of the characters which are to be edited to his or her heart's content while watching the on-screen displayed video picture.

Completing the editing of the character information which is to be recorded in this manner, the user sets to the microcomputer 51 an interval during which the character information is displayed on the screen and then pushes an END key indicative of the completion of data input.

When the END key is pushed, the microcomputer 51 stores the inputted information and then controls the capstan motor controller 53 to rotate the capstan motor 70 in reverse for a predetermined period of time. After the lapse of the predetermined period, the microcomputer 51 controls the capstan motor controller 53 to rotate the capstan motor 70 in the normal state and then controls the character recording/reproducing switch 46 such that a movable terminal c of the switch 46 is connected to one fixed terminal b thereof.

Thereafter, the microcomputer 51, at the character data input point of time, controls the on-screen display signal (OSD) generator 52 to output the on-screen display signal for the character information to the data encoder 41. The encoded signal from the data encoder 41 is applied to the buffer 42. The OSD signal is also supplied to one fixed terminal b of the character selected switch 32. At this time, since the movable terminal c of the switch 32 is connected to the fixed terminal b under the control of the microcomputer 51, the OSD signal from the OSD signal generator 52 is outputted from the character output circuit 30 to the screen, and is imposed on the reproduced video signal from the video reproducing circuit 10.

Simultaneously, the encoded character signal from the encoder 41 is also buffered by the buffer 42 which applies the buffered signal to the adder 43. The adder 43 combines the inputted character information signal with the frequency signal of 70 KHz from the oscillator 44 and outputs the combined signal to the recording amplifier 45 which amplifies the inputted signal by a desired level. The output signal from the recording amplifier 45 is applied to the fixed terminal b of the character recording/reproducing switch 46. At this time, since the movable terminal c of the switch 46 is connected to the fixed terminal b under the control of the microcomputer 51, the output signal from the recording amplifier 45 is recorded on the audio track of the video tape 80 through the audio head 22.

In accordance with a preferred embodiment of the present invention, a position of the video tape 80 wherein the character data RD is recorded is the left audio track ALT as shown in FIG. 4. Herein, the reference numerals ART and VDT designate the right audio track and the video track, respectively, and the reference numeral CPT designates a control pulse track on which a control signal is recorded.

A timing of the operation of recording the character information in the character editing mode is established as shown in FIG. 3. Namely, first, the desired portion of the video picture is stopped in the play mode during an interval of high level as shown in FIG. 3A and then the character data is inputted during an interval of height level as shown in FIG. 3B. Upon completion of the character data input, the capstan motor 70 rotates in reverse for a predetermined period of time during an interval of high level as shown in FIG. 3C. After the lapse of the predetermined period of time, the character data is recorded on the audio track of the video tape 80 during an interval of high level as shown in FIG. 3D. Also, the character data is displayed on-screen during an interval of high level as shown in FIG. 3E (from the character data input point of time (FIG. 3B) to the data recording completion point of time (FIG. 3D)).

On the other hand, when it is desired to reproduce the character data recorded on the audio track of the video tape 80, the microcomputer 51 controls the character recording/reproducing switch 46 such that the movable terminal c of the switch 46 is connected to the other fixed terminal a thereof and controls the character selecting switch 32 such that the movable terminal c of the switch 32 is connected to the other fixed terminal a thereof. As a result, the detected character data from the audio head 22 is applied to the data decoder 31 through the amplifier 24 and equalizer circuit 26 for its decoding. The decoded, reproduced character data from the data decoder 31 is transferred to the D/A converter 33 through the character selecting switch 32 for its analog conversion. The character information signal is outputted from the D/A converter 33 to the character combining unit 34. When the character information signal is outputted from the D/A converter 33 to the character combining unit 34, the character combining unit 34 superimposes the character information signal on the reproduced video signal from the video reproducing circuit 10 and outputs the superimposed signal to the screen.

Further, in case a user doesn't want to display the character signal recorded to the audio track on the screen in the playback mode, only the video signal is displayed on the screen if the movable terminal c of the character recording/ reproducing switch 46 is connected to the fixed terminal d of the character recording/reproducing switch 46.

As hereinbefore described, according to the present invention, the character information signal is digitized and the digitized signal is then recorded on the audio track of the video tape. This approach is in contrast with the conventional manner in which the character information signal is recorded on the video track of the video tape. Also in the playback mode according to the present invention, the recorded character information signal is detected and the detected character information signal is displayed on the screen. Therefore, the character information can be viewed distinctly during playback of the VCR and degradation of the character edited portion on a video picture in playback of the VCR can be prevented, thereby assuring clarity of the video picture. Also, the character editing system is available on a single VCR. Further, in case the user doesn't want to display the character information signal recorded to the audio track on the screen in the playback mode, only the video signal can be displayed on the screen in accordance with the control of microcomputer 51.

Although the preferred embodiments of the present invention have been disclosed for illustrative purposes, those skilled in the art will appreciate that various modifications, additional and substitutions are possible, without departing from the scope and spirit of the invention as disclosed in the accompanying claims.

What is claimed is:

1. A character data recording and reproducing system for recording and retrieving an audio track and a video track on a video tape, wherein character data are recorded on a predetermined portion of the audio track of the video tape, the system comprising:

control means for controlling, in a character editing mode, on-screen display operations and recording control operations for character data inputted into said control means;

recording means for recording said character data inputted into said control means on said predetermined portion of said audio track;

audio reproducing means for retrieving audio signals from said audio track and outputting the retrieved audio signals to a speaker;

character reproducing means for retrieving recorded character data from said predetermined portion of said audio track;

video reproducing means for retrieving video signals from the video track of said video tape; and output means for receiving and selectively outputting said character data inputted into said control means or said recorded character data retrieved by said character reproducing means, and superimposing the outputted character data on the retrieved video signal from said video reproducing means.

2. The system of claim 1, wherein said output means includes:

a data decoder for decoding and outputting the character data retrieved by said character reproducing means;

a character data selector for selectively outputting said character data outputted from said data decoder or said character data input into said control means;

a digital to analog converter for converting into an analog signal an output signal received from said character data selector, and outputting said analog signal; and a character combining unit for superimposing said analog signal from said digital to analog converter on said retrieved video signal from said video reproducing means and outputting the superimposed signal.

3. The system of claim 1, wherein said recording means includes:

a data encoder for encoding and outputting an on-screen display signal from said control means;

a buffer for buffering and outputting an output signal from said data encoder;

an oscillator for generating a reference frequency signal for modulation of character data which is to be recorded;

an adder for combining and outputting an output signal from said buffer and the reference frequency signal from said oscillator;

a recording amplifier for amplifying an output signal from said adder so as to be suitable to a recording head characteristic, and outputting an amplified signal; and a character recording and reproducing switch for selectively applying an amplified output signal from said recording amplifier to said predetermined portion of said video tape for its recording or transferring a detected signal from said predetermined portion of said video tape to said character reproducing means or blocking said detected signal from said predetermined portion of said video tape to said character reproducing means.

4. The system of claim 3, wherein said character recording and reproducing switch is controlled by said control means.

5. The system of claim 1, wherein said control means includes:

a microcomputer for scanning and outputting said character data inputted from a keyboard, controlling said output means to display on-screen said character data, and controlling said recording means to record said character data on said predetermined portion of said video tape in accordance with the scanned inputs from said keyboard;

an on-screen display signal generator for generating an on-screen display signal for said character data outputted from said microcomputer; and a capstan motor controller, controlled by said microcomputer, for controlling an operation of a capstan motor.

6. A character data recording and reproducing system for recording and retrieving an audio track and a video track on a video tape, the system comprising:

means for inputting a signal corresponding to character data which is to be recorded on a predetermined portion of an audio track of a video tape and displayed on-screen superimposed on a video picture;

means for controlling an on-screen display operation and a recording operation of said inputted character data;

means for recording said inputted character data on said predetermined portion of said audio track in accordance with control signals from said control means;

means for retrieving audio signals from said audio track and character data from said predetermined portion of said audio track, outputting the retrieved audio signals to a speaker, and outputting the character data;

means for retrieving video signals from video tracks of said video tape; and means for receiving and selectively outputting said inputted character data from said controlling means or said character data retrieved by said retrieving means, and superimposing said outputted character data on the retrieved video signal from said video retrieving means.

7. The system of claim 6, wherein a keyboard connected with a microcomputer generates said signal corresponding to character data and outputs the signal to the means for inputting the signal.

8. A character data recording and reproducing system for recording and retrieving an audio track and a video track on a video tape, wherein character data are recorded on a predetermined portion of the audio track, the system comprising:

means for recording character data, on said predetermined portion of said audio track, in response to a signal inputted by a user;

means for retrieving audio signals from said audio track and character data from said predetermined portion of said audio track, and outputting the audio signals to a speaker;

means for retrieving video signals from said video track of the video tape; and means for selectively outputting said character data in response to said signal inputted by a user or said recorded character data retrieved by said audio signal and character data retrieving means.

* * * * *